(12) United States Patent
Szkudlarek et al.

(10) Patent No.: US 9,221,973 B2
(45) Date of Patent: Dec. 29, 2015

(54) RESIN COMPOSITION

(75) Inventors: Marian Henryk Szkudlarek, Nordhorn (DE); Johan Franz Gradius Jansen, Geleen (NL); Laurence Jeroen Bleeker, Dronten (NL)

(73) Assignee: DSM IP ASSETS B.V., Heerlen (NL)

( * ) Notice: Subject to any disclaimer, the term of this patent is extended or adjusted under 35 U.S.C. 154(b) by 953 days.

(21) Appl. No.: 13/255,919

(22) PCT Filed: Mar. 24, 2010

(86) PCT No.: PCT/EP2010/053812
§ 371 (c)(1),
(2), (4) Date: Feb. 6, 2012

(87) PCT Pub. No.: WO2010/108941
PCT Pub. Date: Sep. 30, 2010

(65) Prior Publication Data
US 2012/0123047 A1 May 17, 2012

(30) Foreign Application Priority Data

Mar. 25, 2009 (EP) .................................. 09156129

(51) Int. Cl.
| | |
|---|---|
| *C08F 283/01* | (2006.01) |
| *C08F 290/00* | (2006.01) |
| *C08F 290/06* | (2006.01) |
| *C08F 290/14* | (2006.01) |
| *C08G 59/17* | (2006.01) |
| *C08L 63/10* | (2006.01) |
| *C08L 67/06* | (2006.01) |
| *C08L 75/16* | (2006.01) |
| *C08L 91/06* | (2006.01) |

(52) U.S. Cl.
CPC .............. *C08L 67/06* (2013.01); *C08F 283/01* (2013.01); *C08F 290/00* (2013.01); *C08F 290/061* (2013.01); *C08F 290/141* (2013.01); *C08G 59/1466* (2013.01); *C08L 63/10* (2013.01); *C08L 75/16* (2013.01); *C08L 91/06* (2013.01)

(58) Field of Classification Search
CPC .. C08F 283/01; C08F 290/00; C08F 290/061; C08F 290/141; C08G 59/1466; C08L 75/16; C08L 67/06; C08L 63/10; C08L 91/06
USPC ......................................................... 524/487
See application file for complete search history.

(56) References Cited

U.S. PATENT DOCUMENTS

| | | | |
|---|---|---|---|
| 3,510,447 A | 5/1970 | Bourguignon | |
| 4,336,169 A | 6/1982 | Hamer et al. | |
| 4,546,142 A | 10/1985 | Walewski | |
| 4,893,055 A | 1/1990 | Fuzii et al. | |
| 5,286,554 A * | 2/1994 | Cowley et al. | ................. 442/149 |
| 5,380,775 A * | 1/1995 | Cowley et al. | ................. 524/109 |

FOREIGN PATENT DOCUMENTS

| | | |
|---|---|---|
| EP | 0 369 683 | 5/1990 |
| EP | 1 403 298 | 3/2004 |
| GB | 710 513 | 6/1954 |
| GB | 1 295 043 | 11/1972 |
| WO | WO 2004/034017 | 4/2004 |

OTHER PUBLICATIONS

International Search Report for PCT/EP2010/053812, mailed Jun. 2, 2010.
Written Opinion for PCT/EP2010/053812, mailed Jun. 2, 2010.

* cited by examiner

*Primary Examiner* — Angela C Scott
(74) *Attorney, Agent, or Firm* — Nixon & Vanderhye P.C.

(57) ABSTRACT

The present invention relates to a resin composition comprising (a) from 30 to 80 wt. % of an unsaturated polyester resin and/or a vinyl ester resin and (b) from 10 to 50 wt. % of styrene, wherein the resin composition further comprises (c) an ester of itaconic acid and (d) a paraffin oil and/or a paraffin wax.

9 Claims, No Drawings

RESIN COMPOSITION

This application is the U.S. national phase of International Application No. PCT/EP2010/053812 filed 24 Mar. 2010 which designated the U.S. and claims priority to EP Patent Application No. 09156129.0 filed 25 Mar. 2009, the entire contents of each of which are hereby incorporated by reference.

The present invention relates to a resin composition, suitable to be used in the manufacturing of structural parts, comprising (a) from 30 to 80 wt. % of an unsaturated polyester resin and/or a vinyl ester resin and (b) from 10 to 50 wt. % of styrene.

Unsaturated polyester resin or vinyl ester resin compositions currently applied for obtaining structural parts often contain considerable quantities of styrene as reactive diluent. As a result of the presence of styrene, styrene may escape during the preparation and curing, but also even during the envisaged long-term use thereof, and causes an undesirable odour, and possibly even also toxic effects. Thus consequently there is a strong desire to reduce the styrene emission.

The object of the present invention is to reduce the styrene emission in particular from the resin composition when applied in the curing process, especially in open mould applications.

It has surprisingly been found that replacing part of styrene with an ester of itaconic acid as reactive diluent and the additional presence of paraffin oil and/or paraffin wax in the resin composition results in a reduction of the styrene emission more than one would expect from the replaced amount. Accordingly, the resin composition according to the invention comprises (a) from 30 to 80 wt. % of an unsaturated polyester resin and/or a vinyl ester resin, (b) from 10 to 50 wt. % of styrene, (c) an ester of itaconic acid, and (d) a paraffin oil and/or a paraffin wax.

The composition according to the invention comprises from 30 to 90 wt. % of unsaturated polyester resin and/or vinyl ester resin. As used herein, all amounts in wt. % are given relative to the total weight of the unsaturated polyester resin and vinyl ester resin(s) and reactive diluents, unless otherwise specified. The unsaturated polyester resin or vinyl ester resin as is comprised in the resin composition according to the invention may suitably be selected from the unsaturated polyester resins or vinyl ester resin as are known to the skilled man. Examples of suitable unsaturated polyester to be used in the resin composition of the present invention are, subdivided in the categories as classified by M. Malik et al. in J.M.S.—Rev. Macromol. Chem. Phys., C40 (2&3), p. 139-165 (2000).

(1) Ortho-resins: these are based on phthalic anhydride, maleic anhydride, or fumaric acid and glycols, such as 1,2-propylene glycol, ethylene glycol, diethylene glycol, triethylene glycol, 1,3-propylene glycol, dipropylene glycol, tripropylene glycol, neopentyl glycol or hydrogenated bisphenol-A. Commonly the ones derived from 1,2-propylene glycol are used in combination with a reactive diluent such as styrene.

(2) Iso-resins: these are prepared from isophthalic acid, maleic anhydride or fumaric acid, and glycols. These resins may contain higher proportions of reactive diluent than the ortho resins.

(3) Bisphenol-A-fumarates: these are based on ethoxylated bisphenol-A and fumaric acid.

(4) Chlorendics: are resins prepared from chlorine/bromine containing anhydrides or phenols in the preparation of the UP resins.

Besides these classes of resins also so-called dicyclopentadiene (DCPD) resins can be distinguished as unsaturated polyester resins. The class of DCPD-resins is obtained either by modification of any of the above resin types by Diels-Alder reaction with cyclopentadiene, or they are obtained alternatively by first reacting a diacid for example maleic acid with dicyclopentadiene, followed by the usual steps for manufacturing a unsaturated polyester resin, further referred to as a DCPD-maleate resin.

As used herein, a vinyl ester resin is a (meth)acrylate functional resin. The vinyl ester resin may suitably be selected from the vinyl ester resins as are known to the skilled man. Vinyl ester resins are mostly used because of their hydrolytic resistance and excellent mechanical properties. Vinyl ester resins having unsaturated sites only in the terminal position are for example prepared by reaction of epoxy oligomers or polymers (e.g. diglycidyl ether of bisphenol-A, epoxies of the phenol-novolac type, or epoxies based on tetrabromobisphenol-A) with for example (meth)acrylic acid. Instead of (meth)acrylic acid also (meth)acrylamide may be used. As used herein, a vinyl ester resin is an oligomer or polymer containing at least one (meth)acrylate functional end group, also known as (meth)acrylate functional resins. This also includes the class of vinyl ester urethane resins (also referred to as urethane (meth)acrylate resins). Preferred vinyl ester resins are methacrylate functional resins including urethane methacrylate resins and resins obtained by reaction of an epoxy oligomer or polymer with methacrylic acid or methacrylamide, preferably with methacrylic acid. Most preferred vinyl ester resins are resins obtained by reaction of an epoxy oligomer or polymer with methacrylic acid.

The unsaturated polyester resin as may be comprised in the resin composition according to the invention preferably has a molecular weight in the range from 500 to 10.000 Dalton, more preferably in the range from 500 to 5000 even more preferably in the range from 750 to 4000. As used herein, the molecular weight of the resin is determined in tetrahydrofurane using gel permeation chromatography according to ISO 13885-1 employing polystyrene standards and appropriate columns designed for the determination of the molecular weights. The unsaturated polyester resin preferably has an acid value in the range from 0 to 80 mg KOH/g resin preferably in the range from 5 to 70 mg KOH/g resin. As used herein, the acid value of the resin is determined titrimetrically according to ISO 2114-2000. In case a DCPD resin is employed as unsaturated polyester resin the acid value is preferably in the range from 0 to 50 mg KOH/g resin.

The vinyl ester resin as may be comprised in the resin composition according to the invention preferably has a molecular weight in the range from 500 to 3000 Dalton, more preferably in the range from 500 to 1500. The vinyl ester resin preferably has an acid value in the range from 0 to 50 mg KOH/g resin.

The resin composition preferably comprises an unsaturated polyester, preferably a DCPD resin and more preferably a DCPD-maleate resin. The presence of such a resin results in that the decrease of the VOC emission is even more pronounced.

The resin composition comprises styrene in an amount of from 10 to 50 wt. %.

The resin composition according to the invention comprises an ester of itaconic acid (herein after referred to as itaconate ester) as reactive diluent, preferably in an amount of from 1 to 50 wt. %, more preferably in an amount of from 5 to 50 wt. %.

The resin composition according to the invention comprises a reactive diluent. The diluent will be applied, for instance, for lowering of the viscosity of the resin composition in order to make handling thereof more easy. For clarity purpose, a reactive diluent is a diluent that is able to copolymerize with the unsaturated polyester resin and/or vinyl ester resin present in the composition according to the invention.

The itaconate ester is preferably selected from mono(cyclo)alkyl itaconates, di-(cyclo)alkyl itaconates, diol di-itaconates and triol tri-itaconates. Preferred mono(cyclo)alkyl itaconates are C5-C8 cycloalkyl itaconate and C1-C12 alkyl itaconates, more preferably C1-C6 alkyl itaconates. Preferred di-(cyclo)alkyl itaconates are di-C5-C8 cycloalkyl itaconate, di-C1-C12 alkyl itaconates, more preferably di-C1-C6 alkyl itaconates.

Examples of alkyl itaconates are methyl itaconate, ethyl itaconate, propyl itaconate, isopropyl itaconate, hydroxyethyl itaconate. A preferred example of a cycloalkyl itaconate is cyclohexyl itaconate. Examples of di-alkyl itaconates are dimethyl itaconate, diethyl itaconate, dipropyl itaconate, di-isopropyl itaconate, di-hydroxyethyl itaconate dihexyl itaconate. A preferred example of a di-cycloalkyl itaconate is di-cyclohexyl itaconate. Examples of diol di-itaconates are for instance butanediol di-itaconate, butanediol di-itaconate dimethyl ester, (poly)ethyleneglycol di-itaconate, (poly)ethyleneglycol di-itaconate diethylester, (poly)propyleneglycol di-itaconate, (poly)propyleneglycol di-itaconate diethylester Examples of triol tri-itaconates are for instance trimethylolpropane tri-itaconate, trimethylolpropane tri-itaconate trimethyl ester and ethoxylated and propoxylated versions thereof.

In a preferred embodiment, the composition according to the present invention comprises a diester of itaconic acid as itaconate ester. In a more preferred embodiment, a diester of itaconic acid is used as itaconate ester. The diester of itaconic acid preferably has formula

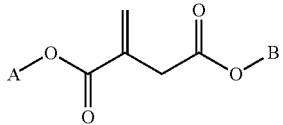

in which A and B may be different or the same and A and/or B being an alkyl group having from 1 to 12 carbon atoms, more preferably from 1 to 6 carbon atoms. Most preferably, A and B are both a methyl group. Accordingly, in a preferred embodiment, the resin composition according to the invention comprises dimethylitaconate.

The composition preferably comprises itaconate ester(s) in an amount, relative to the total amount of reactive diluent, of from 1 to 80 wt. %, preferably from 2 to 70 wt. % and more preferably from 5 to 50 wt. %. Preferably the itaconate esters are derived from a non fossil source such as for example corn.

The resin composition further comprises paraffin oil and/or paraffin wax. Paraffin is the common name for the alkane hydrocarbons with the general formula $C_nH_{2n+2}$. Paraffin wax refers to the solids with $20 \leq n \leq 40$. Paraffin oil refers to the liquids (mixtures) with $15 \leq n \leq 30$. The amount of paraffin oil and/or paraffin wax is preferably from 0.01 to 10 wt. % (relative to the total amount of the unsaturated polyester resin and vinyl ester resin(s) (a), reactive diluents and paraffin oil and/or paraffin wax), more preferably from 0.3 to 7 wt. % and even more preferably from 1 to 5 wt. %. Examples of commercially available paraffin waxes or oils are Byk 740, Byk 750 and Palatal X 960-02 X.

The resin composition preferably further comprises a co-initiator for the radical curing of the resin composition, in an amount of from 0.00001 to 10 wt %. A preferred co-initiator is an amine or a transition metal compound.

The amine co-initiator that may be present in the composition is preferably an aromatic amine and even more preferably a tertiary aromatic amine. Suitable accelerators include N,N-dimethylaniline, N,N-diethylaniline; toluidines and xylidines such as N,N-diisopropanol-para-toluidine; N,N-dimethyl-p-toluidine; N,N-bis(2-hydroxyethyl)xylidine and -toluidine. The amount of amine in the resin composition is generally at least 0.00001 wt. % and preferably at least 0.01 wt. % and more preferably at least 0.1 wt. %. Generally, the amount of amine in the resin composition is at most 10 wt. %, preferably at most 5 wt. %.

Examples of suitable transition metal compounds as co-initiator are compounds of a transition metal with an atomic number of in the range from 22 to 29 or with an atomic number in the range from 38 to 49 or with an atomic number in the range from 57 to 79, such as vanadium, iron, manganese, copper, nickel, molybdenum, tungsten, cobalt, chromium compounds. Preferred transition metals are V, Cu, Co, Mn and Fe.

The resin composition preferably further comprises one or more radical inhibitors. preferably chosen from the group of phenolic compounds, benzoquinones, hydroquinones, catechols, stable radicals and/or phenothiazines. The amount of radical inhibitor as used in the context of the present invention, may, however, vary within rather wide ranges, and may be chosen as a first indication of the gel time as is desired to be achieved.

Suitable examples of radical inhibitors that can be used in the resin compositions according to the invention are, for instance, 2-methoxyphenol, 4-methoxyphenol, 2,6-di-t-butyl-4-methylphenol, 2,6-di-t-butylphenol, 2,4,6-trimethylphenol, 2,4,6-tris-dimethylaminomethyl phenol, 4,4'-thio-bis (3-methyl-6-t-butylphenol), 4,4'-isopropylidene diphenol, 2,4-di-t-butylphenol, 6,6'-di-t-butyl-2,2'-methylene di-p-cresol, hydroquinone, 2-methylhydroquinone, 2-t-butylhydroquinone, 2,5-di-t-butylhydroquinone, 2,6-di-t-butylhydroquinone, 2,6-dimethylhydroquinone, 2,3,5-trimethylhydroquinone, catechol, 4-t-butylcatechol, 4,6-di-t-butylcatechol, benzoquinone, 2,3,5,6-tetrachloro-1,4-benzoquinone, methylbenzoquinone, 2,6-dimethylbenzoquinone, napthoquinone, 1-oxyl-2,2,6,6-tetramethylpiperidine, 1-oxyl-2,2,6,6-tetramethylpiperidine-4-ol (a compound also referred to as TEMPOL), 1-oxyl-2,2,6,6-tetramethylpiperidine-4-one (a compound also referred to as TEMPON), 1-oxyl-2,2,6,6-tetramethyl-4-carboxyl-piperidine (a compound also referred to as 4-carboxy-TEMPO), 1-oxyl-2,2,5,5-tetramethylpyrrolidine, 1-oxyl-2,2,5,5-tetramethyl-3-carboxylpyrrolidine (also called 3-carboxy-PROXYL), aluminium-N-nitrosophenyl hydroxylamine, diethylhydroxylamine, galvinoxyl, phenothiazine and/or derivatives or combinations of any of these compounds.

Advantageously, the amount of radical inhibitor in the resin composition according to the invention is in the range of from 0.0001 to 10% by weight. More preferably, the amount of inhibitor in the resin composition is in the range of from 0.001 to 1% by weight. The skilled man quite easily can assess, in dependence of the type of inhibitor selected, which amount thereof leads to good results according to the invention.

The present invention further relates to a process for radically curing the resin composition according to the invention, wherein the curing is effected by adding an initiator to the resin composition as described above. Preferably, the curing is effected at a temperature in the range of from −20 to +200° C., preferably in the range of from −20 to +100° C., and most preferably in the range of from −10 to +60° C. (so-called cold curing). The initiator is a photoinitiator, a thermal initiator and/or redox initiator.

As meant herein, a photo initiator is capable of initiating curing upon irradiation Photo initiation is understood to be curing using irradiation with light of a suitable wavelength (photo irradiation). This is also referred to as light cure.

A photo-initiating system may consist of a photo initiator as such, or may be a combination of a photo initiator and a sensitizer, or may be a mixture of photo initiators, optionally in combination with one or more sensitizers.

The photo initiating system that can be used in the context of the present invention can be chosen from the large group of photo-initiating systems known to the skilled person. A vast number of suitable photo initiating systems, can be found in, for instance, Volume 3 of "Chemistry and Technology of UV and EB Formulations", $2^{nd}$ Edition, by K. Dietliker and J. V. Crivello (SITA Technology, London; 1998).

The thermal initiator can be selected from azo compounds like for example azo isobutyronitril (AIBN), C—C labile compounds like for example benzopinacole, peroxides, and mixtures thereof. The thermal initiator is preferably an organic peroxide, or a combination of two or more organic peroxides.

The redox initiator is preferably an organic peroxide in combination with at least one of the above mentioned co-initiators. Examples of suitable peroxides are, for instance, hydroperoxides, peroxy carbonates (of the formula —OC(O)OO—), peroxyesters (of the formula —C(O)OO—), diacylperoxides (of the formula —C(O)OOC(O)—), dialkylperoxides (of the formula —OO—), etc.

The present invention further also relates to objects and structural parts prepared from such resin compositions by curing with an initiator as described above. As used herein, structural resin compositions are capable of providing structural parts. Generally such resin compositions are non-aqueous systems. They contain at most 5% by weight of water, mainly resulting from the reactions during resin preparation. As meant herein, structural parts are considered to have a thickness of at least 0.5 mm and appropriate mechanical properties. End segments where the resin compositions according to the present invention can be applied are for example automotive parts, boats, chemical anchoring, roofing, construction, containers, relining, pipes, tanks, flooring, windmill blades.

The invention is now demonstrated by means of a series of examples and comparative examples. All examples are supportive of the scope of claims. The invention, however, is not restricted to the specific embodiments as shown in the examples.

EXAMPLE 1 AND COMPARATIVE EXPERIMENT A

Synolite 8388-P1, a low styrene emitting resin containing paraffin wax and 37 wt. % styrene was obtained from DSM Composite Resins B.V. For the example, styrene was removed from the Synolite 8388-P1 in vacuo and replaced by the mixture of styrene and dimethylitaconate DMI. After this replacement the solid content was checked.

Next 4 mm castings were prepared using 1 wt % Trigonox 44B as peroxide. After release of the castings these were subjected to a post cure of 24 hr 60° C. followed by 24 hr 80° C. Next the casting were subjected to mechanical analysis and determination of the amount of styrene.

Mechanical properties of the cured objects were determined according to ISO 527-2. The Heat Distortion Temperature (HDT) was measured according to ISO 75-A.

The test method for viscosity measurement is according to ISO 3219.

The styrene emission, described as VOC emission, was determined gravimetrically during 30 min at 25° C. using 30 g resin composition and a Petri-dish with a diameter of 12.5 cm.

The curing was monitored by means of standard gel time equipment. This is intended to mean that both the gel time ($T_{gel}$ or $T_{25 \to 35°}$ C.) and peak time ($T_{peak}$ or $T_{25 \to peak}$) were determined by exotherm measurements according to the method of DIN 16945 when curing the resin with the peroxide as indicated.

TABLE 1

|  | Comparative Experiment A | Example 1 |
|---|---|---|
| Styrene (%) | 37 | 32 |
| DMI (%) | 0 | 5 |
| Gel time (min) | 19.3 | 20.5 |
| Peak time (min) | 25.9 | 29.1 |
| Peak temperature (° C.) | 95 | 103 |
| Solid content (%) | 63 | 63 |
| Viscosity @23° C. (mPa · s) | 230 | 270 |
| Tensile strength (MPa) | 36.1 | 36.6 |
| Tensile modulus (MPa) | 3400 | 3400 |
| Elongation at break (%) | 1.04 | 1.06 |
| Flex strength (MPa) | 46.4 | 50 |
| Flexural Modulus (MPa) | 3620 | 3640 |
| HDT (° C.) | 80 | 75 |
| Barcol hardness | 28 | 28 |
| VOC emission (g/m2/30 min) | 6 | 2.2 |

Based on the lowered amount of styrene, one would expect 5.2 g ((32/37)*6) VOC emission in Example 1. So clearly an unexpected synergistic effect of the itaconate ester with styrene is observed. Furthermore it should be noted that the mechanical properties are hardly affected by replacing part of the styrene by the itaconate ester.

Comparative Experiments B-D and Example 2

From Synolite 8388-N1, a DPCD maleate resin containing 37 wt. % styrene, obtained from DSM Composite Resins B.V., styrene was removed in vacuo and replaced by the mixture of styrene and dimethylitaconate DMI. After this replacement the solid content was checked. Optionally paraffin wax was added. Curing and testing was done as in Example 1.

TABLE 2

|  | Comparative Experiment B | Comparative Experiment C | Comparative Experiment D | Example 2 |
|---|---|---|---|---|
| Styrene (%) | 37.3 | 37.3 | 32.3 | 32.3 |
| DMI | 0 | 0 | 5 | 5 |
| Paraffin wax (Byk 740) | 0 | 2.35 | 0 | 2.35 |
| VOC emission (g/m2/30 min) | 35.2 | 5.6 | 32.1 | 3.4 |

By comparing Comp Ex B with D it becomes clear that the presence of DMI only results in a relative increase in VOC emission. Comparing Comp Ex C with D shows that the presence of paraffin wax gives a significant reduction in VOC emission. Surprisingly, comparing Ex 2 with the comparative experiments B-D shows that the unexpected synergetic effect on VOC emission of the combination of both DMI and paraffin wax.

Comparative Experiments E and Example 3

Comparative Experiment A and Example 1 was repeated except that Synolite 1408-P-1, an ortho resin containing paraffine wax, was used instead of Synolite 8388-P1.

TABLE 3

|  | Comparative Experiment E | Example 3 |
|---|---|---|
| Styrene (%) | 44.1 | 39.1 |
| DMI (%) | 0 | 5 |
| Gel time (min) | 27.5 | 28.1 |
| Peak time (min) | 48.8 | 55.1 |
| Peak temperature (° C.) | 66 | 61 |
| Solid content (%) | 55.9 | 55.9 |
| Viscosity @23° C. (mPa · s) | 240 | 265 |
| Tensile strength (MPa) | 48 | 47 |
| Tensile modulus (MPa) | 3680 | 3850 |
| Elongation at break (%) | 1.34 | 1.2 |
| Flex strength (MPa) | 86 | 66 |
| Flexural Modulus (MPa) | 3880 | 4000 |
| HDT (° C.) | 71 | 71 |
| Barcol hardness | 33 | 33 |
| VOC emission (g/m2/30 min) | 5.2 | 3.4 |

Based on the lowered amount of styrene, one would expect a VOC emission of 4.6 g ((39.1/44.1)*5.2) in Example 3. So again an unexpected synergistic effect of the itaconate ester with styrene is observed.

The invention claimed is:

1. A resin composition comprising:
   (a) 30 to 80 wt. % of an unsaturated polyester resin and/or a vinyl ester resin,
   (b) 10 to 50 wt. % of styrene as reactive diluent,
   (c) dimethylitaconate as reactive diluent,

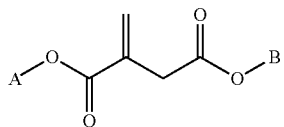

wherein the dimethylitaconate is present in an amount of 1 to 80 wt. %, based on total amount of reactive diluent present in the resin composition, and
   (d) 1 to 5 wt. % of a paraffin oil and/or a paraffin wax, based on total amount of the unsaturated polyester resin and vinyl ester resin, reactive diluent and paraffin oil and/or paraffin wax present in the resin composition.

2. The resin composition according to claim 1, wherein the composition comprises an unsaturated polyester resin.

3. The resin composition according to claim 1, wherein the unsaturated polyester resin is a dicyclopentadiene resin.

4. The resin composition according to claim 1, wherein the dimethylitaconate is present in an amount, relative to the total amount of reactive diluent, of 2 to 70 wt. %.

5. The resin composition according to claim 1, wherein the dimethylitaconate is present in an amount, relative to the total amount of reactive diluent, of 5 to 50 wt. %.

6. The resin composition according to claim 1, wherein the dimethylitaconate is derived from a non-fossil source.

7. A resin curing process which comprises adding an initiator to the resin composition according to claim 1 to effect radical curing thereof.

8. A cured object or structural part obtained by curing the resin composition according to claim 1 with an initiator.

9. The cured object or structural part according to claim 8, in the form of automotive parts, boats, chemical anchoring, roofing, construction, containers, relining, pipes, tanks, flooring or windmill blades.

* * * * *